Patented July 15, 1952

2,603,621

UNITED STATES PATENT OFFICE 2,603,621

FIBER FORMING COMPOSITION CONTAINING POLYMERIZED ACRYLONITRILE

Alfred B. Craig, Dayton, and Earl W. Gluesenkamp, Centerville, Ohio, assignors to Monsanto Chemical Company, St. Louis, Mo., a corporation of Delaware No Drawing. Application November 27, 1950,
Serial No. 197,827

9 Claims. (Cl. 260—45.5)

This invention relates to new and valuable fiber forming compositions. More specifically the invention relates to acrylonitrile polymers capable of being dyed by conventional procedures especially with acid dyestuffs.

It is well-known that polyacrylonitrile and copolymers of acrylonitrile and other monoolefinic polymerizable monomers are excellent fiber forming copolymers. The polyacrylonitrile and copolymers of more than 75 per cent acrylonitrile and up to 25 per cent of other polymerizable monomers produce fibers with superior tensile properties, desirable elongation, and excellent stability under a wide range of physical and chemical conditions. These polymers are subject to inherent disabilities which greatly restrict the utility in the fabrication of general purpose fibers. For example, the fibers do not have sufficient dye affinity to enable the development of satisfactory colored fibers, and the limited range of colors produced by conventional dyeing techniques are not stable to laundering and dry-cleaning procedures.

The purpose of this invention is to provide a new and valuable general purpose fiber. A further purpose of the invention is to provide fiber forming acrylonitrile polymers which are dye-receptive by conventional procedures. A still further purpose of the invention is to provide a convenient means for modifying non-dye receptive acrylonitrile polymers and converting them into polymers with excellent dye affinity without depreciating the properties of the fibers produced therefrom.

It has been found that non-dyeable fiber forming polymers and copolymers of the prior art, such as polyacrylonitrile and copolymers of 95 per cent of acrylonitrile and five per cent vinyl acetate may be made into dyeable form by the incorporation of substantial proportions of polymers of N-vinylimidazole.

The prior art acrylonitrile polymers which may be modified by the incorporation of polymers of N-vinylimidazole are polyacrylonitrile, and copolymers of 75 per cent or more per cent acrylonitrile and up to 25 per cent of monomers, such as vinyl acetate and other vinyl esters of monocarboxylic acids having up to four carbon atoms, methyl methacrylate, and other alkyl methacrylates having up to four carbon atoms in the alkyl radical, methyl acrylate and other alkyl acrylates having up to four carbon atoms in the alkyl groups, dimethyl fumarate and other dialkyl fumarates having up to four carbon atoms in the alkyl groups, dimethyl maleate and other dialkyl maleates having up to four carbon atoms in the alkyl groups, styrene, α-methylstyrene, and other vinyl or isopropenyl substituted aromatic hydrocarbons, vinyl chloroacetate and other vinyl esters of halo substituted acetic acids, vinylidene chloride, and methacrylonitrile. These polymers and copolymers are, in general, of negligible dye receptivity and therefore are not useful in the preparation of general purpose fibers.

In the practice of this invention polymers of N-vinylimidazole are separately prepared and intimately mixed with the non-dyeable acrylonitrile polymers. The resulting blends will be spinnable by conventional methods into fibers which are receptive to acid dyeable conventional dyeing procedures.

The polymers of N-vinylimidazole may be the homopolymer, or they may be copolymers of N-vinylimidazole and a wide variety of olefinic monomers copolymerizable therewith. Useful monomers for effecting this polymerization are styrene, α-methylstyrene, vinyl chloride, vinylidene chloride, vinyl acetate, acrylonitrile, methacrylonitrile, acrylic acid, methacrylic acid, maleic anhydride, the alkyl acrylates, the alkyl methacrylates, vinyl ethers, alkyl crotonates, the alkyl maleates, the alkyl fumarates, butadiene, isoprene, and chloroprene. Since the copolymers of N-vinylimidazole and acrylonitrile have good thermal stability and solvent resistance, these copolymers are usually preferred. The copolymers are added in such proportions that from two to 15 per cent of the total monomers in the blended composition is N-vinylimidazole.

The polymers and copolymers of N-vinylimidazole may be prepared by mass, solution, or emulsion polymerization procedures in the various manners well-known to the art. A preferred method of polymerization involves a reaction in aqueous medium in the presence of suitable dispersing agents and suitable free radical producing catalysts.

In the preparation of the emulsion copolymers of N-vinylimidazole it has been found that a wide variety of emulsion stabilizing agents may be used, but the alkali metal salts of formaldehyde condensed naphthalene sulfonic acids, and various alkali metal salts of fatty acids and fatty acid mixtures have been unusually successful. As catalysts, various peroxides, both oil and water-soluble types as well as azo derivatives may be used.

The non-dyeable fiber forming polymers and the N-vinylimidazole polymers may be blended by any conventional liquid or solid mixing machine, for example Banbury mixers, roll mills or dough mixers. Although the mixing may take place at elevated temperatures where the polymers are soft solids or in semi-liquid state, it is preferred to add suitable solvents or plasticizers to achieve the same state at lower temperatures. Suitable solvents for blending the acrylonitrile polymers and the N-vinylimidazole polymers are N,N-dimethylformamide, N,N-dimethylacetamide, α-butyrolactone, ethylene carbonate, and N,N-dimethylmethoxyacetamide. These various solvents are added in sufficient proportions to render the mixed solids liquid or plastic, in which conditions thorough intimate mixing of the solid components is more easily effected. In general, from 50 to 90 per cent of the solvent will produce the desired semiliquid or soft solid state.

In the preparation of the blended polymers the quantity of each component will depend upon the amount of N-vinylimidazole desired in the final composition and upon the proportion of N-vinylimidazole in the N-vinylimidazole polymer. In general, from two to 30 per cent of the blending composition with from 98 per cent to 70 per cent of the non-dyeable polymer will include the most useful proportions.

The blended compositions are fabricated into synthetic fibers by conventional wet and dry spinning methods. After stretching the fibers of the blended acrylonitrile polymers to develop the necessary orientation in the fiber and the incidental tensile strength, and thereafter heat shrinking to improve their resistance to elevated temperatures, valuable general purpose fibers are thereby obtained.

Further details of the practice of this invention are set forth with respect to the following examples:

Example 1

A mixture of 70 grams of acrylonitrile and 70 grams of N-vinylimidazole was mixed with one per cent by weight of azodiisobutyronitrile, and the resultant mixture added over a period of 1.2 hours to 800 grams of water containing four grams of sodium stearate and two grams of the sodium salt of formaldehyde condensed naphthalenesulfonic acid. The reaction was maintained at 83° C. throughout the polymerization. After all of the monomers had been added the mixture was steam distilled to remove unreacted monomers. The material was dried at 70° C. overnight and then dissolved in N,N-dimethylacetamide to form a 24 per cent solution.

The resultant solution was then blended with an 18 per cent solution of a polymer of 97 per cent of acrylonitrile and three per cent vinyl acetate, also in N,N-dimethylacetamide. Sufficient of the vinyl acetate copolymer was added to yield a solution of a blended polymer of which the N-vinylimidazole represented 6.6 per cent of the solid polymer. The solution so prepared was spun into fibers having a tenacity of 4.5 g./d. and an elongation of six per cent and a boil shrinkage of 10.4 per cent. The fiber so prepared exhausted both two and ten per cent Wool Scarlet dyebaths in sixty minutes.

Example 2

Using the procedure described in the preceding example a series of blends were prepared from the copolymer of 97 per cent by weight of acrylonitrile and three per cent of vinyl acetate and from the copolymer of 50 per cent of acrylonitrile and 50 per cent of N-vinylimidazole. The fibers were spun from each blend and were found to be dyeable and possessing the following characteristics:

| Weight Per Cent N-vinylimidazole | Spinning Solution Concentration | grams/denier | Stretch Rates | Percent Boil Shrinkage | Elongation |
|---|---|---|---|---|---|
| 6.4 | 18.1 | 4.5 | 5.55 | 10.4 | 6 |
| 3.8 | 15.1 | 3.5 | 3.78 | 8.6 | 7 |
| 15.1 | 18.7 | 3.3 | 4.97 | 10.5 | 7–8 |
| 5 | 17 | 4.0 | 4.64 | 8 | 6 |

All of these fibers were found to exhaust both two per cent and ten per cent dyebaths.

The invention is defined by the following claims.

What we claim is:

1. A dyeable fiber forming composition comprising a blend of a polymer of at least 75 per cent of acrylonitrile and a polymer of N-vinylimidazole, the components of the blend being so proportioned as to provide from two to ten per cent N-vinylimidazole in polymeric form, based on the total weight of polymerized monomers in the blended polymer.

2. A dyeable fiber forming composition comprising a blend of from 70 to 98 per cent of a polymer of at least 75 per cent of acrylonitrile and up to 25 per cent of another polymerizable olefinic monomer, and from two to 30 per cent of a polymer of at least 30 per cent of N-vinylimidazole and up to 70 per cent of another polymerizable olefinic monomer.

3. A dyeable fiber forming composition comprising a blend of polyacrylonitrile and a copolymer of at least 30 per cent of N-vinylimidazole with another polymerizable olefinic monomer, the components of the blend being so proportioned as to provide from two to ten per cent of N-vinylimidazole in polymeric form, based on the total weight of polymerized monomers in the blended polymer.

4. A dyeable fiber forming composition comprising a blend of a copolymer of at least 75 per cent of acrylonitrile and up to 25 per cent of vinyl acetate and a copolymer of from 30 to 90 per cent by weight of N-vinylimidazole and ten to 70 per cent of acrylonitrile, the components of the blend being so proportioned as to provide from two to ten per cent of N-vinylimidazole in polymeric form, based on the total polymerized monomers in the blended polymer.

5. A dyeable fiber forming composition comprising a blend of a copolymer of 97 per cent by weight of acrylonitrile and three per cent of vinyl acetate and a copolymer of 50 per cent by weight of acrylonitrile and 50 per cent of N-vinylimidazole, said copolymers being so proportioned that from two to ten per cent of the total monomer in polymeric form in both copolymers is N-vinylimidazole.

6. A dyeable fiber forming composition comprising a blend of a copolymer of acrylonitrile and another polymerizable olefinic monomer and a copolymer of 50 per cent by weight of acrylonitrile and 50 per cent of N-vinylimidazole, said copolymers being so proportioned that from two to ten per cent of the total monomer in polymeric form in both copolymers is N-vinylimidazole.

7. A dyeable fiber-forming composition comprising a blend of a copolymer of at least 75 per cent of acrylonitrile and up to 25 per cent of another polymerizable olefinic monomer, and a copolymer of at least 30 per cent of N-vinylimidazole and up to 70 per cent of another polymerizable olefinic monomer.

8. A dyeable fiber-forming composition comprising a blend of polyacrylonitrile and a copolymer of 50 per cent by weight of acrylonitrile and 50 per cent by weight of N-vinylimidazole, the components of the blend being so proportioned that from 2 to 10 per cent of the total monomer in polymeric form in both components is N-vinylimidazole.

9. A dyeable fiber-forming composition comprising a blend of a copolymer of at least 75 per cent of acrylonitrile and up to 25 per cent of another polymerizable olefinic monomer, and a polymer of N-vinylimidazole, the components of the blend being so proportioned as to provide from 2 to 10 per cent N-vinylimidazole in polymeric form based on the total weight of polymerized monomers in the blended polymer.

ALFRED B. CRAIG.
EARL W. GLUESENKAMP.

REFERENCES CITED

The following references are of record in the file of this patent:

UNITED STATES PATENTS

| Number | Name | Date |
|---|---|---|
| 2,527,863 | Webb | Oct. 31, 1950 |